No. 750,895. PATENTED FEB. 2, 1904.
A. J. ROBINSON.
GRINDING MILL.
APPLICATION FILED MAR. 13, 1903.
NO MODEL. 3 SHEETS—SHEET 3.
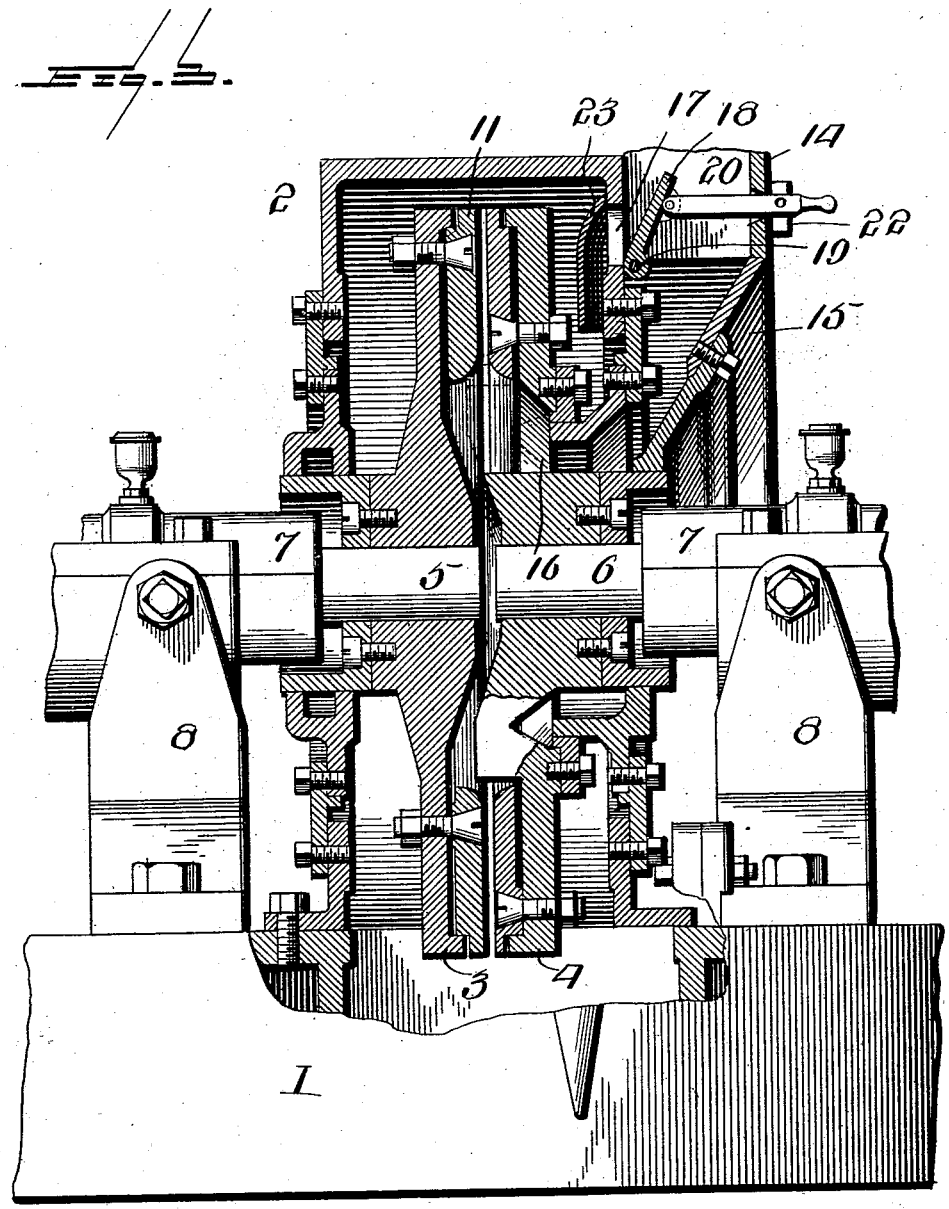
WITNESSES:
Wm F Doyle.
N. Reynolds
INVENTOR
Aaron J. Robinson.
BY
Rexford M. Smith
Attorney No. 750,895. Patented February 2, 1904.

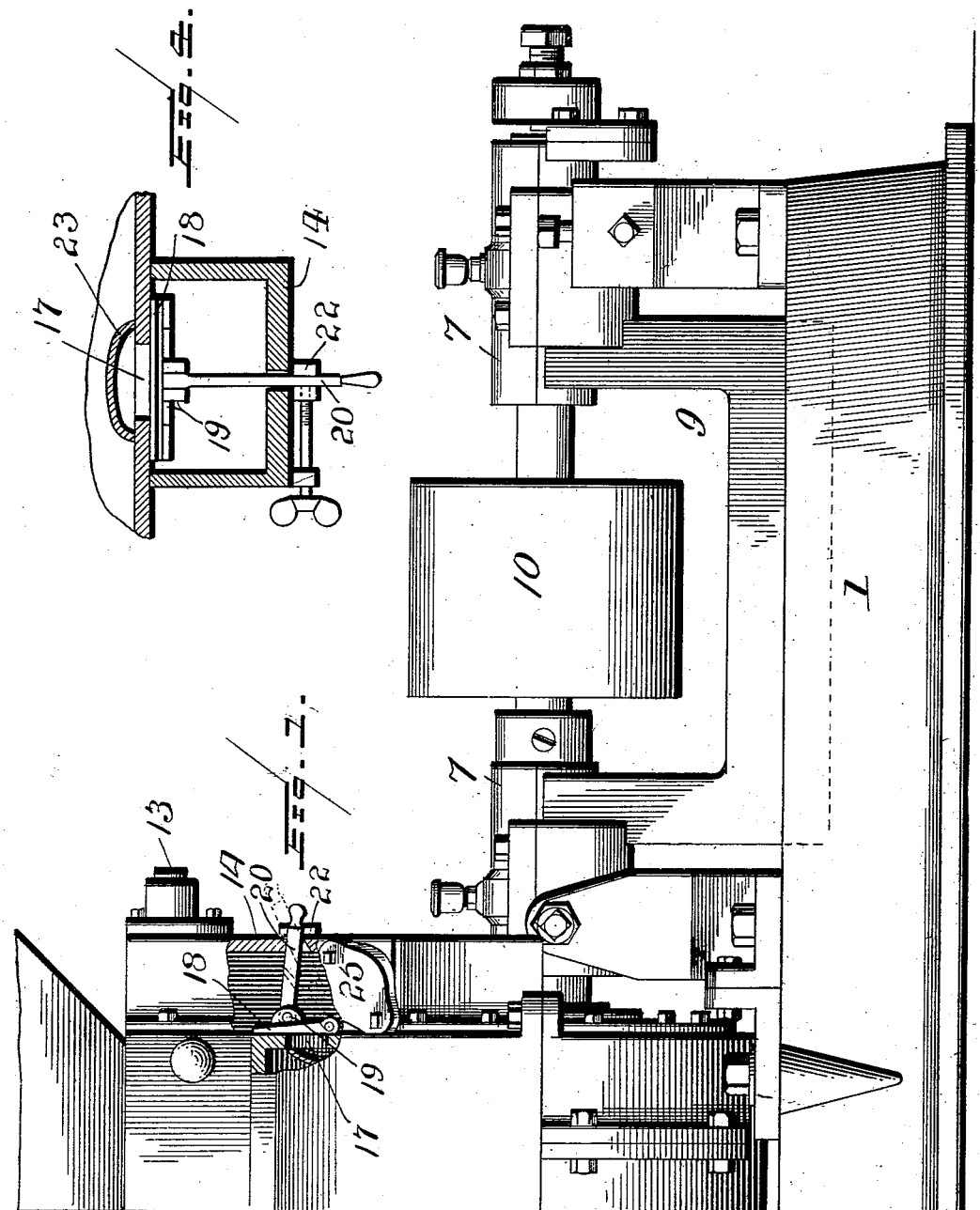

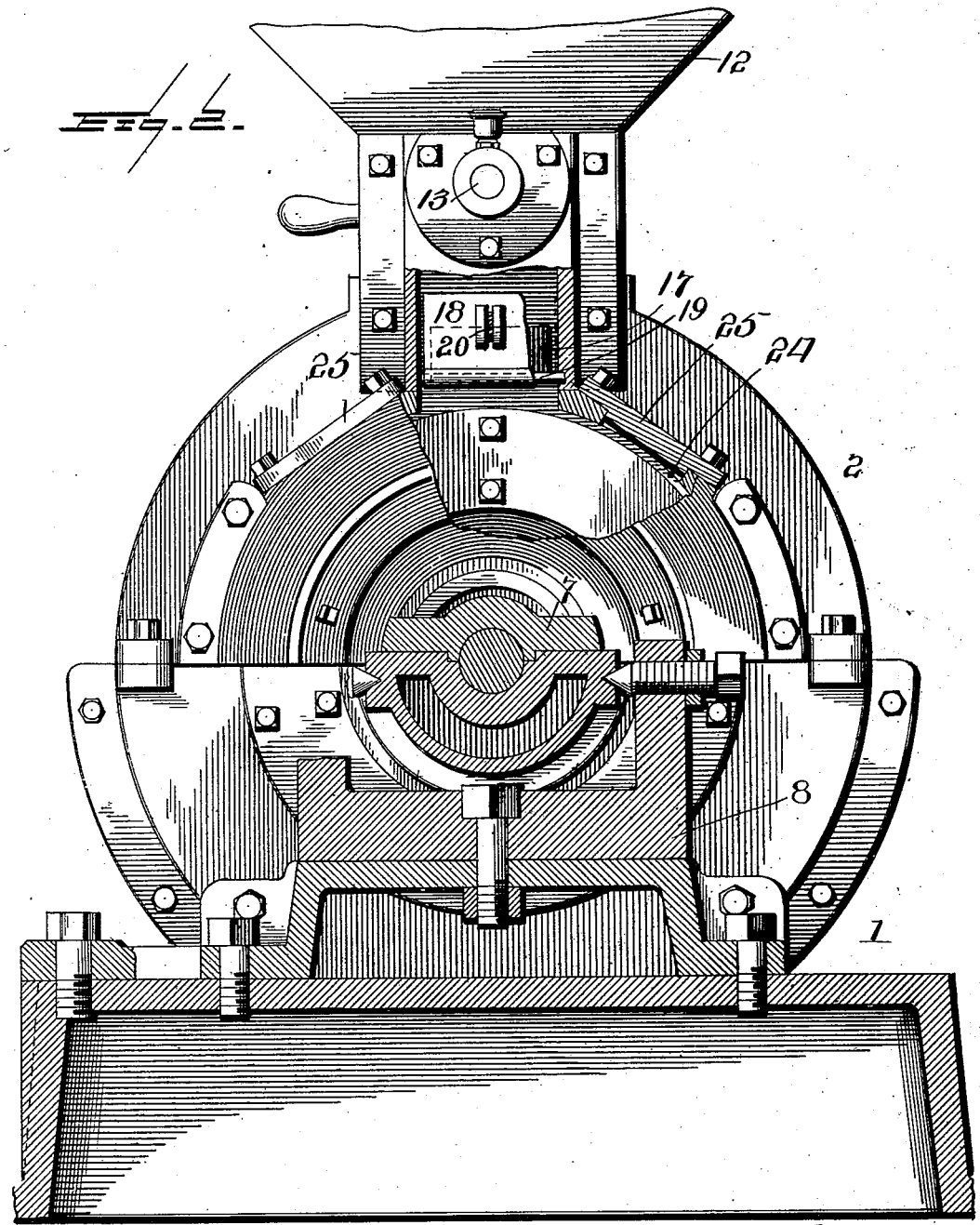

UNITED STATES PATENT OFFICE.

AARON J. ROBINSON, OF FREMONT, NEW HAMPSHIRE.

GRINDING-MILL.

SPECIFICATION forming part of Letters Patent No. 750,895, dated February 2, 1904.

Application filed March 13, 1903. Serial No. 147,638. (No model.)

*To all whom it may concern:*

Be it known that I, AARON J. ROBINSON, a citizen of the United States, residing at Fremont, in the county of Rockingham and State of New Hampshire, have invented a certain new and useful Grinding-Mill, of which the following is a specification, reference being had therein to the accompanying drawings.

It is usual in mills of the type commonly called "attrition" mills to admit unground material to the ground product before the sifting or bolting process for the purpose of keeping the meshes of the screen from becoming clogged. Now to admit the small quantity necessary for this purpose without the use of an extra feeder has been difficult on account of the smallness of the opening through which such material must pass and the liability of said opening to become choked or clogged. In a high-speed mill of the character referred to a current of air is generated within the casing by the disks and is driven into the elevator-casing, carrying with it the ground product, and thereby causing considerable waste of the finer particles.

The object of this invention is to provide means for removing a portion of the whole corn or unground product from the whole body of material passing from the feeder into the grinding-space, such portion of the material being taken from the feed-spout at a point between the feeding mechanism and the grinding mechanism and delivered unground to the elevator, by means of which the said portion of the material is carried and delivered to the sieve or bolt, where it operates to clean the sieve or bolt and free the meshes thereof from obstructing and clogging material, such as those particles of the ground product which are too large to get through the meshes of the screen.

Another object of the invention is to provide means for adjusting and regulating the amount of unground material taken from the whole body thereof in the manner above referred to.

A further object of the invention is to provide means for counteracting to a considerable extent the tendency of the current of air generated by the rapidly-revolving grinding-disks to pass into the elevator and force the fine meal through the crevices of the elevator in its passage to the screen or bolt.

The invention also has for its object to provide means for effecting a return of the unfinished product, or that which has not been ground to a sufficient fineness, into the feed-throat of the machine at a point between the grinding-space and that point, as above stated, at which the unground product is diverted from the main body of the material passing through the grain-spout, thus preventing any of the unfinished product from entering the opening at the side of the case.

With the above and other objects in view, the nature of which will more fully appear as the description proceeds, the invention consists in the novel construction, combination, and arrangement of parts, as hereinafter fully described, illustrated, and claimed.

In the accompanying drawings, Figure 1 is a view in elevation of a sufficient portion of a vertical disk grinding-mill to illustrate the application of the present invention thereto. Fig. 2 is a vertical cross-section through the machine taken at one side of the disk-inclosing casing and showing a portion of the feed-throat and feed-spout broken away to better illustrate the present invention. Fig. 3 is a vertical longitudinal section through the central portion of the mill, showing the disks, casing, feed-spout, and feed-throat, &c., in cross-section. Fig. 4 is a detail view showing the means for fastening the handle or operating-bar of the deflector.

Similar numerals of reference designate corresponding parts in all figures of the drawings.

The grinding-mill with which the present invention is shown is of the type known as "vertical disk grinding or attrition" mills, in which 1 designates the base or bed piece of the machine, 2 the casing in which the grinding-disks operate, and 3 and 4 the grinding-disks themselves, which are mounted on the sections 5 and 6, respectively, of the divided main shaft of the machine. The shaft-sections 5 and 6 are mounted in suitable bearings 7, supported by means of chairs 8, while, as shown in Fig. 1, the bearings 7 at one side of the center of the machine are connected by means of a yoke 9.

The sections 5 and 6 of the shaft are provided with pulleys, one of which is shown at 10, the same being adapted to receive suitable driving-belts, so arranged and actuated as to drive the shaft-sections in opposite directions, thus causing the grinding-disks 3 and 4 to rotate in opposition to each other, the grinding-disks being provided upon their inner adjacent faces with hard grinding-plates 11, which may be removed and renewed whenever necessary, the casing for that purpose being sectional or separable, as illustrated in Fig. 3 and as particularly described in another application filed by me of even date with the present application.

Arranged at the top of the machine is a hopper 12, in which the material to be ground is placed. Adjacent to the bottom of the hopper is arranged a feeder, the shaft by which it is operated being shown at 13. The feeder transfers the material from the bottom of the hopper into a feed-spout 14, arranged at one side of the casing upon the outside thereof, said feed-spout extending downward and communicating with a feed-throat 15, which embraces the hub of the adjacent grinding-disk and delivers the material through an opening or series of openings 16 at or near the center of the adjacent grinding-disk, the material thereby finding its way to the grinding-space between the disks.

In carrying out the present invention a port-hole 17 is formed, preferably in the side of the casing 2, as illustrated in the drawings, the said port-hole being preferably located near the top of the casing, as best shown in Fig. 3. The port-hole 17 affords communication between the feed-spout 14 and the interior of the casing 2. Arranged within the feed-spout 14 and immediately adjacent to the port-hole 17 is a deflector 18, consisting of a plate hinged at 19, adjacent to the hole 17, with its free edge extending upward, as shown, said deflecting-plate being adapted to catch and divert any desired portion of the material passing downward through the feed-spout and direct the same into the casing 2.

The deflector 18 has pivotally connected therewith one end of a handle or operating-bar 20, which extends outward through an opening in the outer wall of the feed-spout, so that it may be moved inward and outward by hand for the purpose of adjusting the angle or position of the deflecting-plate. The operating-bar or handle 20 may be fastened at any desired point of adjustment by means of a binding-screw 21, mounted in a lug or bearing 22 on the spout 14. Located within the casing 2 is a guard or hood 23, which extends over and covers the port-hole 17, the upper portion of the hood being arched and connected to the interior of the casing, while the lower portion thereof is left open, so as to allow the unground material to pass downward at one side of the grinding-disks. The guard or hood 23 while causing the unground material to pass downward allows a portion of the current of air generated by the rapidly-revolving grinding-disks to pass through the port-hole 17, around the deflecting-plate 18, and downward through the feed-throat 15 through the opening 16 in the adjacent grinding-disk and into the grinding-space. The guard or hood 23 also prevents the meal from escaping through the port-hole 17 and directs said meal downward to the open bottom of the casing. By this means a portion of the current of air generated by the disks is diverted and prevented from passing outward through the bottom of the casing into the usual conveyer or elevator, and to that extent the tendency of the meal to find its way through the crevices of the elevator-casing and elsewhere is overcome.

The feed-throat 15 is provided at one or more points with port-holes 24, provided with detachable covers 25. Each of said port-holes 24 is located in such manner as to admit the unground material previously diverted by the deflecting-plate 18 and also the coarser particles of the ground product from the sieve into the feed-throat at a point between the deflecting-plate and the grinding-space. Such material is conducted from the sieve or bolt back to the feed-throat by means of a suitable pipe or conductor. (Not shown.)

The handling of the material after leaving the mill is so well understood that it is not considered necessary herein to illustrate the elevator and sieve or bolt, which, as previously stated, are of the ordinary construction and arranged in the usual way.

Having thus described the invention, what I claim as new, and desire to secure to Letters Patent, is—

1. A grinding-mill comprising a divided main shaft, grinding-disks thereon rotating in opposition to each other, a casing inclosing said disks, a feed-spout arranged at one side of the casing and adapted to discharge into the grinding-space between the disks, and an adjustable deflector located within the feed-spout between the hopper and opening of grinding-disk, and adapted to divert a portion of the material passing through the spout and deliver the same unground to a point beyond the action of the grinding-disks where it may be conducted to the usual screen or bolt, substantially as described.

2. A grinding-mill comprising a divided main shaft, grinding-disks thereon rotating in opposition to each other, a casing inclosing said disks and provided with a side port, a feed-spout arranged at one side of the casing and adapted to discharge into the grinding-space between the disks, and an adjustable deflector located within the feed-spout and controlling the side port of the casing for deflecting a portion of the unground material from said hopper into the casing and delivering the same from the machine without subjecting it to the action of the grinding-disks.

3. A grinding-mill comprising a divided main shaft, grinding-disks thereon rotating in opposition to each other, a casing inclosing said disks and provided with a side port, a feed-spout arranged at one side of the casing and adapted to discharge into the grinding-space between the disks, a hinged deflector located within the feed-spout and controlling said port for deflecting a portion of the unground material from the spout into the casing at one side of the grinding-disks, and means for adjusting the angle of said deflector and thereby regulating the quantity of material diverted from the feed-spout.

4. A grinding-mill comprising a divided main shaft, grinding-disks thereon rotating in opposition to each other, a casing inclosing said disks and provided with a side port, a feed-spout arranged at one side of the casing and adapted to discharge into the grinding-space between the disks, and an adjustable deflector located within the feed-spout and controlling said port for deflecting a portion of the unground material into the casing at one side of the grinding-disks, and a guard or hood within the casing covering said port and adapted to keep the diverted portion of the material away from the grinding-disks.

5. A grinding-mill comprising a divided main shaft, grinding-disks thereon rotating in opposition to each other, a casing inclosing said disks and provided with a side port, a feed-spout arranged at one side of the casing and adapted to discharge into the grinding-space between the disks, and an adjustable deflector located within the feed-spout and controlling said port for deflecting a portion of the material into the casing at one side of the grinding-disks, an operating-bar or handle extending from the deflector outward through the feed-spout, and means for fastening said operating-bar or handle.

6. A grinding-mill comprising a divided main shaft, grinding-disks thereon rotating in opposition to each other, a casing inclosing said disks, a feed-spout arranged at one side of the casing and adapted to discharge into the grinding-space between the disks, and deflecting means within the feed-spout for diverting a portion of the material from the feed-spout away from the action of the grinding-disks, and a feed-throat provided with one or more return-ports located in such manner as to admit the unfinished product to the feed-throat between the deflecting means and the grinding-space, substantially as described.

In testimony whereof I affix my signature in presence of two witnesses.

AARON J. ROBINSON.

Witnesses:
  REXFORD M. SMITH,
  L. M. GOTWALD.